(12) United States Patent
Lee et al.

(10) Patent No.: US 8,042,751 B2
(45) Date of Patent: Oct. 25, 2011

(54) NOZZLE SYSTEM FOR INJECTOR

(75) Inventors: Myung Jun Lee, Yongin (KR); Chang Il Kim, Ansan (KR); Choong-Won Lee, Daegu (KR)

(73) Assignee: Hyundai Motor Company, Seoul (KR)

( * ) Notice: Subject to any disclaimer, the term of this patent is extended or adjusted under 35 U.S.C. 154(b) by 235 days.

(21) Appl. No.: 12/267,456

(22) Filed: Nov. 7, 2008

(65) Prior Publication Data

US 2009/0140077 A1    Jun. 4, 2009

(30) Foreign Application Priority Data

Dec. 4, 2007  (KR) .................. 10-2007-0125198

(51) Int. Cl.
*B05B 1/34* (2006.01)
(52) U.S. Cl. ........ 239/493; 439/470; 439/471; 439/464; 439/533.12
(58) Field of Classification Search .................. 239/471, 239/470, 493
See application file for complete search history.

(56) References Cited

U.S. PATENT DOCUMENTS

| | | | | |
|---|---|---|---|---|
| 1,040,827 A * | 10/1912 | White | ............................. | 239/482 |
| 1,259,052 A * | 3/1918 | Starr | ............................. | 239/493 |
| 1,581,223 A * | 4/1926 | Moore | ............................. | 239/8 |
| 2,539,315 A * | 1/1951 | Murphy | ............................. | 239/404 |
| 3,100,084 A * | 8/1963 | Biber | ............................. | 239/463 |
| 4,360,156 A * | 11/1982 | Soth et al. | ............................. | 239/11 |
| 5,979,801 A * | 11/1999 | Munezane et al. | ............................. | 239/533.12 |
| 2006/0196172 A1 | 9/2006 | Johnson et al. | | |

FOREIGN PATENT DOCUMENTS

DE  197 40 026 A1  8/1998
GB  2 170 269 A  7/1986

* cited by examiner

*Primary Examiner* — Dinh Nguyen
(74) *Attorney, Agent, or Firm* — Morgan, Lewis & Bockius LLP

(57) ABSTRACT

A nozzle system for an injector may include a casing that has an inlet through which liquid flows and an injector outlet through which liquid is outwardly injected, a swirler that is disposed inside the casing and includes at least one swirl groove formed in the exterior circumference thereof through which liquid passes and a swirl chamber formed between an end portion thereof and the injector outlet, and a needle for controlling liquid injection whereby swirl torque is generated when the liquid flows into the swirl chamber through the swirl groove and the liquid swirls in the swirl chamber.

14 Claims, 2 Drawing Sheets

NOZZLE SYSTEM FOR INJECTOR

CROSS-REFERENCE TO RELATED APPLICATION

This application claims priority to, and the benefit of, Korean Patent Application No. 10-2007-0125198 filed in the Korean Intellectual Property Office on Dec. 4, 2007, the entire contents of which are incorporated for all purposes herein by reference.

BACKGROUND OF THE INVENTION

1. Field of the Invention

The present invention relates to a nozzle system of an injector, and in various aspects, to a nozzle system of an injector for a vehicle in which a structure thereof is improved and atomization performance of liquid that is injected is enhanced.

2. Description of Related Art

Generally, vehicles are classified as gasoline vehicles, diesel vehicles, and LPG vehicles according to types of fuel. The diesel vehicles among them have high power for high load as well as lower fuel consumption and thus have increasing demand.

However, more polluting materials such as nitrogen oxide and particulate material are included in the exhaust gas of diesel vehicles compared to the gasoline vehicles. Accordingly, a variety of exhaust gas filter apparatuses are under development so as to purify the diesel exhaust gas by processing the polluting materials.

One conventional solution is a selective catalyst reduction (SCR) apparatus which uses a catalyst so as to reduce nitrogen oxide that is included in the exhaust gas to nitrogen and oxygen. The application range for such a system is becoming broader. Research into a urea-SCR apparatus utilizing urea as a reduction agent has been actively conducted. The basic principle of such urea-SCR apparatus is to transform the nitrogen compound $NO_x$, which is harmful to the human body, to harmless nitrogen $N_2$ by a chemical reaction of ammonia and a catalyst.

Figure 1:
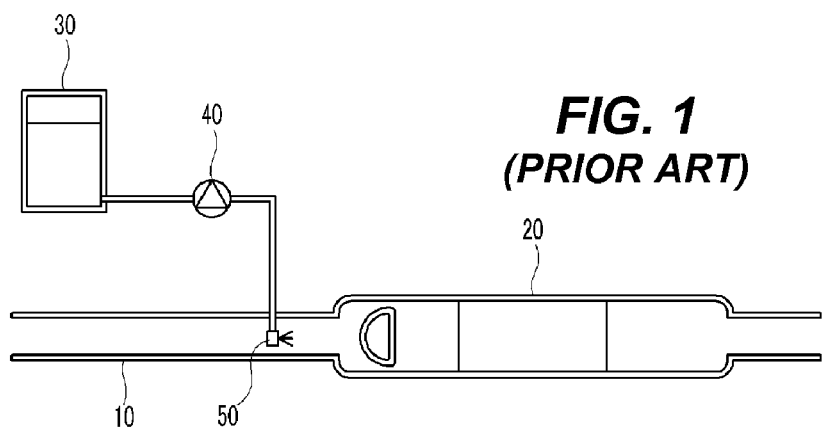

FIG. 1 is a schematic diagram of a conventional urea-SCR apparatus. Exhaust gas is exhausted from an exhaust manifold of an engine through an exhaust pipe 10. As shown in FIG. 1, the SCR apparatus 20 is disposed in the exhaust pipe 10 in the flow of exhaust gas.

An injector 50 is disposed inside the exhaust pipe 10, wherein the injector 50 injects urea upstream of the SCR apparatus 20 according to flow of the exhaust gas. The urea is injected into the exhaust pipe 10 through the injector 50 in the form of aquatic solution. The injector 50 receives the urea from a urea tank 30, where the urea is stored, through a urea supply pump 40. The injector injects the urea into the exhaust pipe 10.

The injected urea is transformed to ammonia in the exhaust pipe 10 in which the urea is vaporized and decomposed by thermal energy of the exhaust gas. Further, nitrogen oxide that reacts with the ammonia is transformed to harmless nitrogen.

Accordingly, the operation to purify the nitrogen oxide is substantially performed not by the urea but by the ammonia. Accordingly, it is beneficial that the injected urea solution have excellent vaporization and thermal decomposition performance.

The vaporization and thermal decomposition performance of the urea can be improved as the particle size of the injected urea becomes smaller. Accordingly, there is a desire to improve the performance of the SCR apparatus by increasing the atomization performance of the urea.

One such solution focuses on the injector nozzle. The nozzle shape of the injector 50 can be variously changed so as to efficiently atomize the urea that is injected into the exhaust pipe 10. However, it is generally difficult to atomize the urea that is injected in a solution state.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

The present invention has been made in part in an effort to provide a nozzle system for an injector having advantages of improving atomization performance.

A nozzle system for an injector may include a casing including an inlet through which liquid flows and an injector outlet through which liquid is outwardly ejected, a swirler disposed inside the casing, the swirler including at least one swirl groove formed in the exterior circumference thereof through which the liquid passes and a swirl chamber formed between an end portion of the casing and the injector outlet, and a needle for controlling liquid injection in the swirler whereby swirl torque is generated when the liquid flows into the swirl chamber through the swirl groove and swirls in the swirl chamber.

In various embodiments, the nozzle system further includes a nozzle block that is disposed inside the casing between the swirler and the injector outlet and faces the swirler, the nozzle block forming the swirl chamber, the nozzle block including a nozzle hole that leads from the swirl chamber to the injector outlet.

A recess portion having a recessed shape may be formed in one side of the nozzle block and the nozzle hole is formed substantially in the middle of the nozzle block.

A slanted portion having a narrowing cross-section in a direction towards the end portion may be formed at an exterior circumference of the swirler. The swirl groove may be formed at an exterior circumference of the slanted portion.

The slanted portion of the swirler may be formed as frustoconical shape. The recess portion may have a conical shape.

A route of the swirl groove that is projected along a plane to which an end surface of the slanted portion is extended may be formed in a tangential direction of the circumference the cut end surface of the slanted portion.

In various embodiments, the strength of the swirl torque and a shape of a film of the injected liquid are changed according to at least one of width, cross-sectional area, liquid route, and a combination thereof of the swirl groove. In various embodiments, the strength of the swirl torque and the shape of the liquid film that is injected are changed according to a slope angle of the slanted portion.

The swirler may include a needle hole extending in a length direction, wherein the needle is inserted into the needle hole and configured to move up and down therein. The swirler and needle may be configured such that as the needle moves up and down in a length direction, an inflow of liquid into the swirl chamber may be cut off or released.

The swirler may include at least the two swirl grooves in parallel with each other. A route of liquid route in the swirl groove, which is in communication with the swirl chamber, may extend to an outside portion of the center portion of the swirl chamber.

In the present invention, the atomization performance of a solution that is injected through the nozzle may be improved.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 1 is a schematic diagram of a conventional urea-SCR apparatus.

FIG. 2 is a cross-sectional view of a nozzle system of an injector in accordance with the present invention.

FIG. 3 is a perspective view of a swirler in accordance with the present invention.

FIG. 4 is a front view of the swirler shown in FIG. 3.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A nozzle system of an injector according to various embodiments of the present invention can be applied to a nozzle system that is disposed in an injector so as to inject a liquid urea solution in a film shape. One skilled in the art, however, will appreciate that the nozzle system and injector of the present invention may be used in a variety of other applications and industries.

As shown in FIG. 2, the nozzle system according to various embodiments of the present invention includes a casing 510 through which liquid flows from a liquid supply apparatus (not shown). A swirler 520 disposed inside the casing 510 is configured for liquid to pass therethrough. A nozzle block 530 through which the liquid is injected after passing the swirler 520 is configured to generate a swirl of the liquid. By "swirl" it is meant a turbulent, circular, or swirling motion of the liquid. A needle 540 is provided to control the injection of the liquid in the system.

An inlet 511 through which the liquid flows is formed in an upper side of the casing 510, and an injector outlet 512 through which the liquid is outwardly ejected is formed in a lower side of the casing 510.

The liquid flows into the casing 510 through the inlet 511 and passes the swirler 520 and a slanted portion 523. In various embodiments, a cross-section of the slanted portion becomes smaller in a liquid injection direction toward its end portion. The slanted portion may be formed in the swirler 520. A portion of the exterior circumference of the swirler 520, except the slanted portion 523, comes into contact with a portion of the interior circumference of the casing 510. A swirl groove 521, through which the liquid can pass, is formed in the exterior circumference. In this instance, the liquid progresses in a downward direction through the swirl groove 521.

A nozzle block 530 may be positioned or equipped inside the casing 510. The nozzle block is positioned to coincide with a lower part of the swirler 520. Further, a recess portion 532 that has a concave shape is formed in an upper part of the nozzle block 530 to correspond to the shape of the slanted portion 523 of the swirler 520, and the slanted portion 523 of the exterior circumference of the swirler 520 comes in contact with the recess portion 532.

A nozzle hole 531 is formed through the center of the nozzle block 530, and the nozzle hole 531 communicates with the injector outlet 512 of the casing 510. Accordingly, the liquid is injected through the swirl groove 521, the nozzle hole 531, and the injector outlet 512.

Referring to FIG. 2 and FIG. 3, the slanted portion 523 of the swirler 520 and the recess portion 532 of the nozzle block 530 may contact each other in whole or in part.

A swirl chamber 550 is formed by a gap between the recess portion 532 and the end portion of the slanted portion 523. In various embodiments, the gap is formed in the central portion of the recess portion and slanted portion. Further, the swirl chamber 550 communicates with the nozzle hole 531 of the nozzle block 530.

A route of the liquid in the swirl groove 521 is formed such that swirl torque is generated in the swirl chamber 550 when the liquid that passes through the swirl groove 521 flows into the swirl chamber 550.

Accordingly, when the liquid passes through the swirl groove 521, a swirl is formed in the swirl chamber 550 and a liquid film, which forms an air-core in the central portion of the swirl chamber 550, is formed by centrifugal force when the liquid flows to the nozzle hole 531. The swirl torque further relates to a rotational inertia of the swirling fluid.

The liquid film that is formed in the swirl chamber 550 rotates along the interior circumference of the nozzle hole 531 and is injected outwardly as a liquid film with a substantially conical shape through the injector outlet 512.

Accordingly, the nozzle system of an injector according to various embodiments of the present invention does not inject the liquid in a beam shape, Rather, the system injects the liquid in a thin conical film shape. Accordingly, after injection, the contact area of the thin liquid film with outside air is greater such that atomization thereof is promoted.

In addition, the slanted portion 523 of the swirler 520 may have a conical shape as shown in FIG. 3. That is, an upper section of the swirler 520 may have a substantially cylindrical exterior circumference so as to contact an interior circumference of the casing 510. The slanted portion 523 may have a substantially conical shape of which a centerline thereof is the same as that of the cylindrical section. One will appreciate from the foregoing that the slanted portion 523 may be in the form of a triangular pyramid, a quadrangular pyramid, a polygonal pyramid, and other shapes.

Further, as shown in FIG. 2 and FIG. 3, a part of the small end of the slanted portion 523 may be cut off such that both end surfaces of the swirler 520 are in a parallel with each other. In various embodiments, the swirler has a frustoconical shape. The swirl chamber 550 can be formed at a central region of the recess portion 532 of the nozzle block 530 if the small end of the slanted portion 523 is partially cut off.

The shape of the recess portion 532 may be in the form of a cone corresponding to the slanted portion 523 of the swirler 520. The swirl chamber 550 may also in the form of a cone.

The swirl torque of the liquid can be further increased in the swirl chamber 550 by utilizing a conical shape.

Further, as shown in FIG. 2 and FIG. 3, the swirl groove 521 can be formed to have a straight liquid route that is perpendicular to the circumferential direction of the slanted portion 523. In various embodiments, the groove 521 may follow a curved line route.

Figure 4:
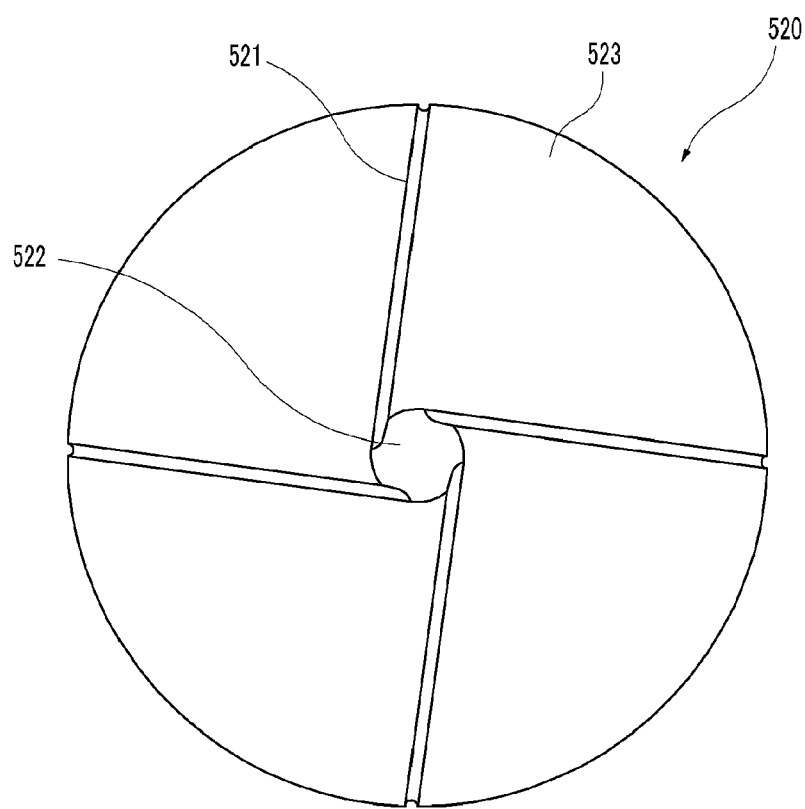

As shown in FIG. 4, the straight swirl groove 521 is formed to be tangential to a circumference of the cut end surface of the slanted portion 523. That is, when the small end of the slanted portion 523 is cut in parallel to the large end thereof, the cut end surface forms a circle. The route of the swirl groove 521 may be formed in a direction that is tangential to the circle. In other words, when the swirl groove 521 is projected along an imaginary plane in which the cut end surface of the slanted portion 523 is extended, as shown in FIG. 4, the route of the swirl groove 521 is formed in a tangential line direction and communicates with the circumference of the cut end surface of the slanted portion 523.

The liquid that passes through the swirl groove 521 moves in the tangential line direction of the end surface of the slanted portion 523 according to the route. When it flows into the swirl chamber 550, torque is generated by the tangential line direction speed and thereby the swirl is formed in the swirl chamber 550.

Depending on the application, a plurality of the swirl grooves 521 can be formed. In various embodiments, three or four are formed.

When a plurality of the swirl grooves 521 are formed, the swirl grooves 521 may be symmetrically formed in a circumference direction of the swirler 520 at uniform intervals.

Further, the torque of the swirl can be adjusted by the shape, the cross-section size, and the route of the swirl groove 521, as well as the slope angle of the slanted portion 523. Accordingly, the form and the injection angle of the liquid film that is injected through the nozzle hole 531 and injector outlet 512 can be adjusted. The nozzle system controls the injection of the liquid by the needle 540 in the above description.

Figure 2:
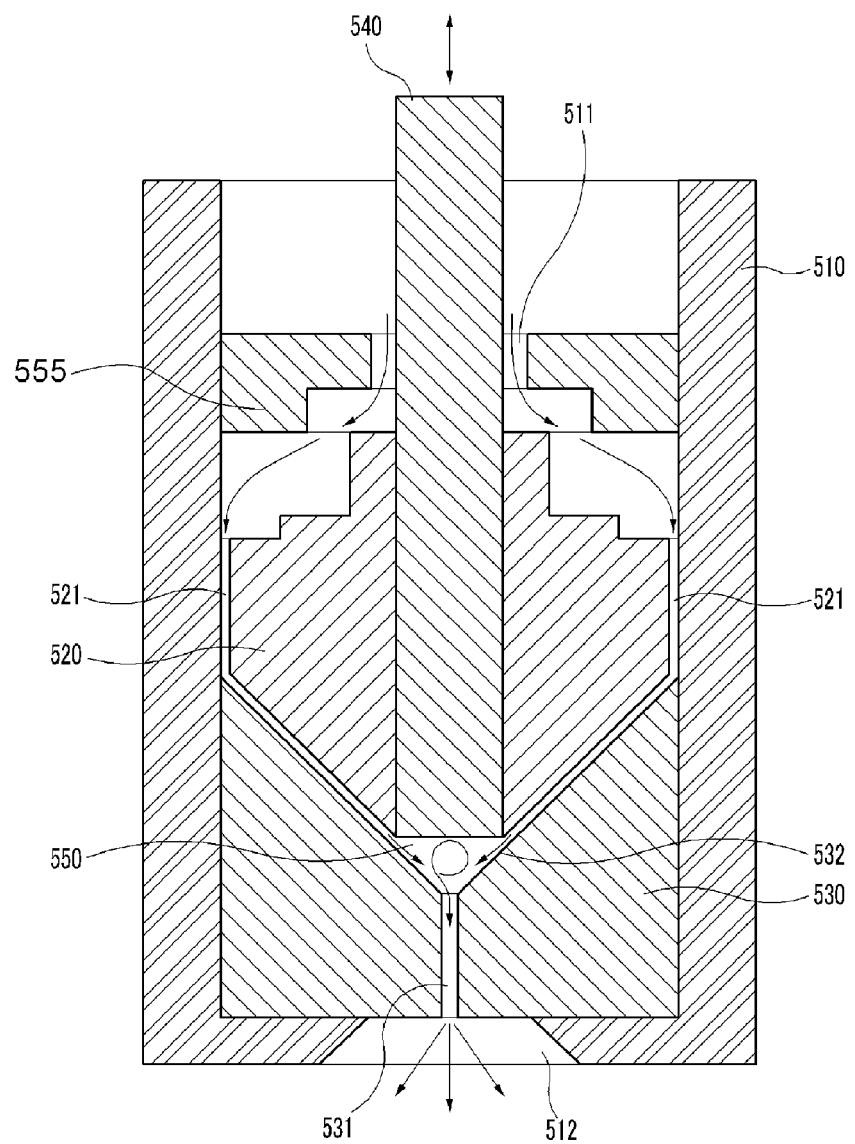

The needle 540 may also be disposed in the inlet 511 of the casing 510 or the inlet side of the swirl groove 521 for adjustment. As shown in FIG. 2, the needle 540 penetrates the swirler 520. Also, the needle 540 can be configured to reciprocate up and down to prevent or release inflow of the liquid into the swirl chamber 550 from the swirl groove 521.

A needle hole 522 that penetrates the swirler 520 in a length direction may be formed in the center portion of the swirler 520 to receive the needle. The needle 540 is inserted into the needle hole 522 and moves up and down in a length direction.

As shown in FIG. 2, as the needle 540 moves down inside the needle hole 522, the needle 540 comes in contact with at least a portion of the interior circumference of the swirl chamber 550, that is, the interior circumference of the recess portion 532. Accordingly, the needle 540 prevents the flow of the liquid into the nozzle hole 531. Further, as the needle 540 moves up, the liquid is supplied into the nozzle hole 531.

Figure 3:
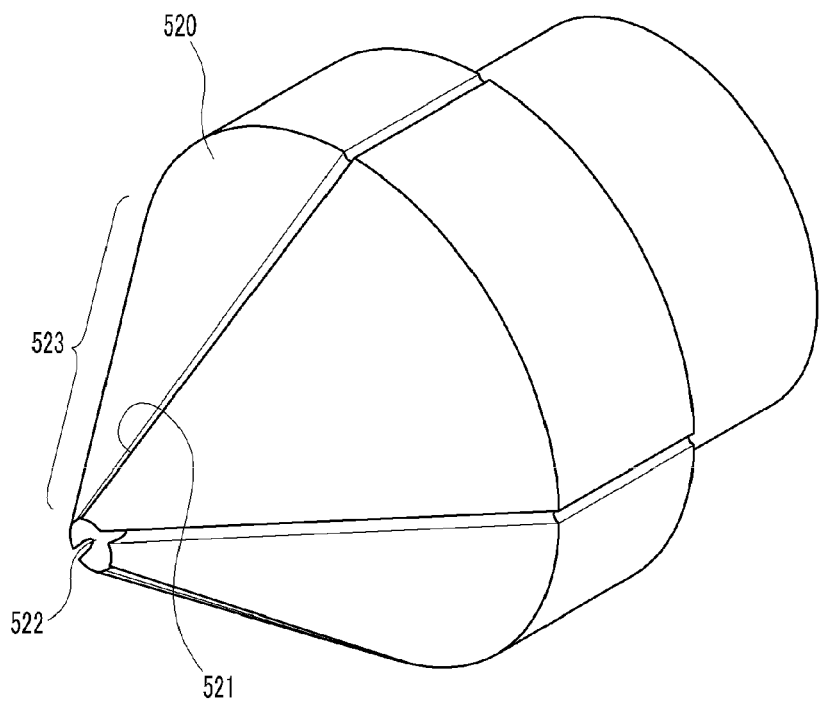

The diameter of the needle hole 522, as shown in FIG. 2 to FIG. 4, may be the same as that of the cut end surface of the slanted portion 523 of the swirler 520. Accordingly, the distance that the needle 540 moves up and down is short such that prompt control thereof is possible. The upward and downward movement of the needle 540 can be performed by a separate solenoid (not shown).

For convenience in explanation and accurate definition in the appended claims, the terms "upper" or "lower", "front" or "rear", "inside" or "outside", and etc. are used to describe features of the exemplary embodiments with reference to the positions of such features as displayed in the figures.

In an exemplary embodiment of the present invention, the casing 510 includes an insertion plate 555 having the inlet 511 through which the needle 540 is inserted and fixed to the swirler 520. A gap may be formed between an interior circumference of the inlet 511 and the outer circumference of the needle 540 and liquid is supplied through the gap.

When the swirler 520 moves downwards, the liquid is supplied through the inlet 511 and when the swirler 520 moves upwards, an upper surface of the swirler 520 contacts a lower surface of the isolation plate 555 for the swirler 520 to close the inlet 511 such that the liquid cannot be supplied through the inlet 511.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A nozzle system for an injector comprising:
a casing including an inlet through which liquid flows and an injector outlet through which liquid is outwardly ejected;
a swirler disposed inside the casing, the swirler including at least one swirl groove formed in the exterior circumference thereof through which the liquid passes and a swirl chamber formed between an end portion of the swirler and the injector outlet in the casing; and
a needle slidably inserted into the swirler and for controlling liquid injection according to movement of the needle in the swirler whereby swirl torque is generated when the liquid flows into the swirl chamber through the swirl groove and swirls in the swirl chamber;
wherein the swirl chamber has a conical shape that is defined by a lower flat end of the needle and the recess portion; and
wherein the needle ascends and descends to open and close, respectively, the swirl groove.

2. The nozzle system for an injector of claim 1, further comprising a nozzle block that is disposed inside the casing between the swirler and the injector outlet and faces the swirler, the nozzle block forming the swirl chamber, the nozzle block including a nozzle hole that leads from the swirl chamber to the injector outlet.

3. The nozzle system for an injector of claim 2, wherein a recess portion having a recessed shape is formed in one side of the nozzle block and the nozzle hole is formed substantially in the middle of the nozzle block.

4. The nozzle system for an injector of claim 1, wherein a slanted portion having a narrowing cross-section in a direction towards the end portion is formed at an exterior circumference of the swirler, further wherein the swirl groove is formed at an exterior circumference of the slanted portion.

5. The nozzle system for an injector of claim 4, wherein the slanted portion of the swirler is formed as frustoconical shape.

6. The nozzle system for an injector of claim 3, wherein the recess portion has a conical shape.

7. The nozzle system for an injector of claim 5, wherein a route of the liquid in the swirl groove projected along a plane to which the cut end surface of the slanted portion is extended is formed in a tangential direction of the circumference the cut end surface of the slanted portion.

8. The nozzle system for an injector of claim 4, wherein the strength of the swirl torque and a shape of a film of the injected liquid are changed according to at least one of width, cross-sectional area, liquid route, and a combination thereof of the swirl groove.

9. The nozzle system for an injector of claim 1, wherein the swirler includes a needle hole extending in a length direction, wherein the needle is inserted into the needle hole and configured to move up and down therein, further wherein as the needle moves up and down in a length direction, an inflow of liquid into the swirl chamber is cut off or released.

10. The nozzle system for an injector of claim 7, wherein the swirler includes at least the two swirl grooves in parallel with each other.

11. The nozzle system for an injector of claim 7, wherein a liquid route of the swirl groove in communication with the swirl chamber extends to an outside portion of the center portion of the swirl chamber.

12. The nozzle system for an injector of claim 4, wherein the strength of the swirl torque and the shape of the liquid film that is injected are changed according to a slope angle of the slanted portion.

13. The nozzle system for an injector of claim 1, wherein a lower end of the needle is flat such that the swirl chamber formed between the end portion of the needle and the injector outlet in the casing.

14. A nozzle system for an injector comprising:
a casing including an inlet through which liquid flows and an injector outlet through which liquid is outwardly ejected;
a swirler disposed inside the casing, the swirler including at least one swirl groove formed in the exterior circumference thereof through which the liquid passes and a swirl chamber formed between an end portion of the swirler and the injector outlet in the casing; and
a needle wherein the swirler is attached to a lower end of the needle through the inlet such that the swirler moves up and down in the casing according to a movement of the needle;
wherein an isolation plate is formed in the casing and having the inlet; and
wherein the needle controls liquid injection in the swirler whereby swirl torque is generated when the liquid selectively flows into the swirl chamber through the inlet and the swirl groove and swirls in the swirl chamber according to the movement of the needle;
wherein the swirl chamber has a conical shape that is defined by a lower flat end of the needle and the recess portion; and
wherein the needle ascends and descends to open and close, respectively, the swirl groove.

* * * * *